United States Patent [19]
Omi

[11] Patent Number: 5,659,831
[45] Date of Patent: Aug. 19, 1997

[54] DETECTION DEVICE AND METHOD TO LOCATE FILM

[75] Inventor: Junichi Omi, Kawasaki, Japan

[73] Assignee: Nikon Corporation, Tokyo, Japan

[21] Appl. No.: 519,183

[22] Filed: Aug. 25, 1995

[30] Foreign Application Priority Data

Sep. 5, 1994 [JP] Japan .................................. 6-211391

[51] Int. Cl.⁶ .................................. G03B 1/18; G03B 1/00
[52] U.S. Cl. .......................... 396/395; 396/398; 396/403
[58] Field of Search .......................... 354/173.1, 215, 354/213, 206; 396/395, 398, 403

[56] References Cited

U.S. PATENT DOCUMENTS

| | | | |
|---|---|---|---|
| 4,972,214 | 11/1990 | Shibayama et al. | 354/173.1 |
| 5,023,640 | 6/1991 | Diehl | 354/173.1 |
| 5,136,314 | 8/1992 | Kazami et al. | 354/173.1 |
| 5,398,090 | 3/1995 | Ezawa | 354/173.1 |
| 5,410,380 | 4/1995 | Kawamura et al. | 354/213 |

*Primary Examiner*—Russell E. Adams
*Assistant Examiner*—Daniel Chapik
*Attorney, Agent, or Firm*—Oliff & Berridge

[57] ABSTRACT

A detection apparatus for locating a film position detects the position with a simple structure. The apparatus uses a plurality of position detection holes for each picture frame in a film. The holes are repeatedly formed in the film in a certain arrangement and correspond to detection bodies located in the camera. The device includes a signal output circuit generating signals indicative of the proper or improper positioning of the film based on alignment between the holes and the detection bodies.

30 Claims, 5 Drawing Sheets

DETECTION DEVICE AND METHOD TO LOCATE FILM

BACKGROUND OF THE INVENTION

1. Field of the Invention

The invention relates to a method and an apparatus to detect the position of film in a photographic device, such as a camera or the like. The method and device sense position detection holes in the film.

2. Description of Related Art

Japanese Unexamined Patent Application, Sho 57-74735 discloses a device to detect a film's position. This device uses signal detection holes formed on a film, which are distinct and different from holes used for feeding the film. The device detects the passing of the signal detection holes as the film is fed using an optical sensor or electrical switch facing the film supply passage in the camera.

Japanese Unexamined Patent Application Sho 57-202524 discloses a device to determine the position of each picture frame in a film. The device includes detection pins, which can be inserted into holes in the film, to determine the position of the film. When the detection pins are inserted into the holes, the device detects the feeding of a frame of film, by actuating a switch that is in interlocking cooperation with the pin.

Several problems exist in each of the above apparatuses. In Japanese Unexamined Patent Application Sho 57-74735, the signals from the sensor or switch are inverted several times as the film is fed. Therefore, it is necessary to provide the device with a circuit that can generate a signal corresponding to a starting or ending edge of the film that is different from the signal for a picture frame. The structure of the detection circuit becomes complicated with this type of signal generation.

In Japanese Unexamined Patent Application Sho 57-202524, the output signal is inverted when the film supply signal quantity equals the picture frame signal quantity. The relationship between the signals from the switches and for the film position is clear and the structure of the detection circuit is relatively simple. However, problems arise when additional through holes are provided for other purposes. These through holes may detect the recording start position data for the film and be positioned between the position determining holes. Therefore, it is necessary to take precautions not to have additional holes detected by the picture frame detection switch. This leads to a complicated circuit and associated detection device.

SUMMARY OF THE INVENTION

An object of the invention is to provide a film position detection apparatus and method having a relatively simple structure for use in a camera. The apparatus permits additional through holes to be used in the film without impairing the detection of a film frame.

The detection apparatus includes a plurality of detection bodies positioned to move orthogonally to a film supply passage. A film having a plurality of position detection holes formed in alignment with a picture frame is loaded into the camera and fed to the position detection device. A picture frame of the film is aligned with detection holes when a single picture frame is positioned at a specific position in the film supply passage. The detection bodies are biased toward the film supply passage and into the position detection holes. Signal output devices generate signals when the detection bodies are inserted into the position detection holes.

The invention achieves another object of detecting the differences in the spacing between the position detecting holes for a single frame and adjacent frames in the film. The device also indicates a proper alignment of the film and designated exposure area of the camera. This and other objects will become evident from the following description of the invention.

BRIEF DESCRIPTION OF THE DRAWINGS

The invention will be described in detail with reference to the following drawings in which like reference numerals refer to like element and wherein.

DETAILED DESCRIPTION OF PREFERRED EMBODIMENTS

Figure 1:
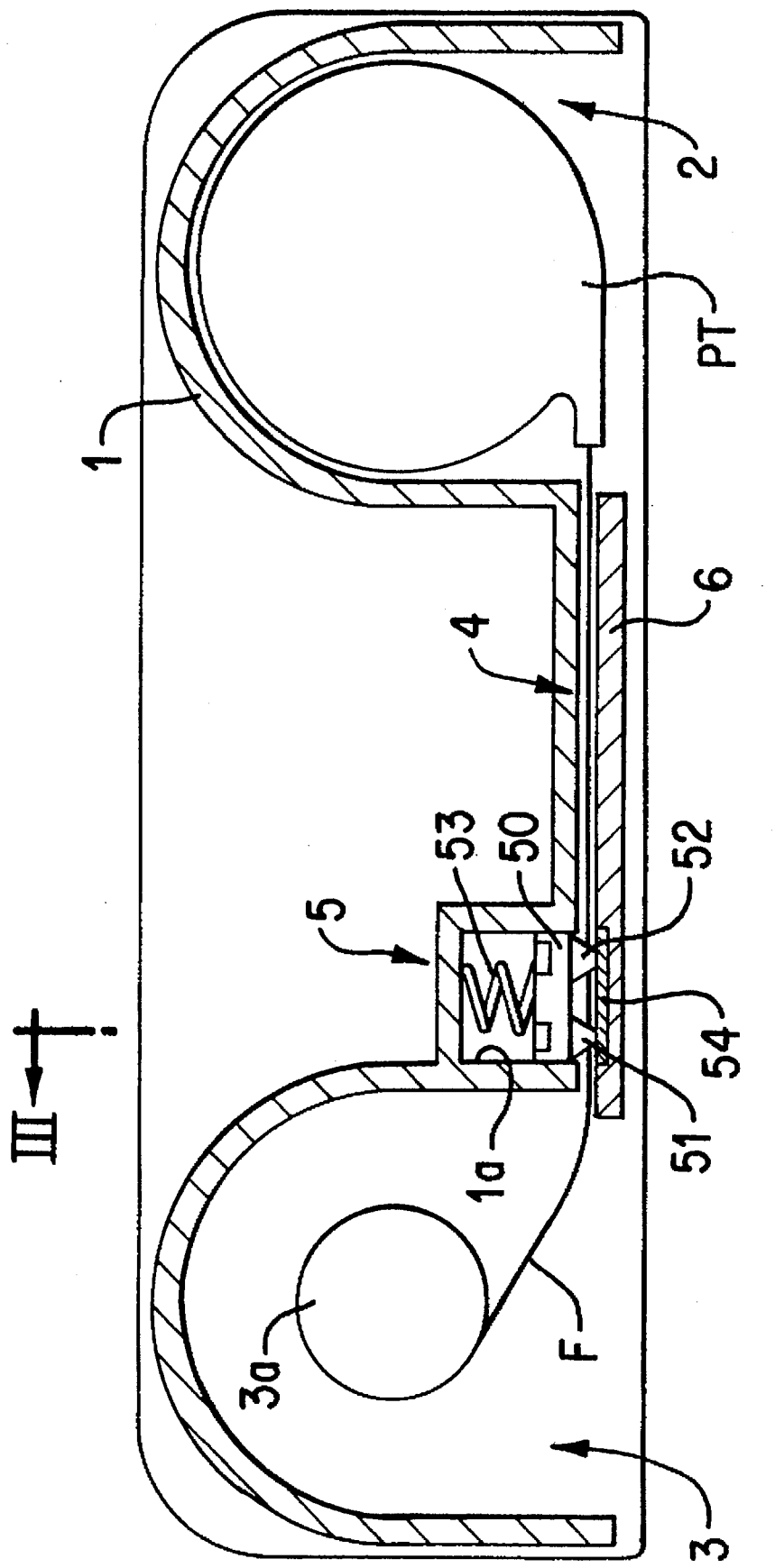
FIG. 1 is a horizontal cross-sectional view of a camera, including a detection apparatus according to a first embodiment of the invention.

FIG. 1 shows the structure of the camera including a detection apparatus according to first embodiment. The camera main body 1 includes a cartridge chamber 2 and a spool chamber 3. A cartridge PT is mounted in the cartridge chamber 2. The film F is unwound from the chamber 2 and subsequently wound onto rolling spool 3a in spool chamber 3. The film F passes through exposure part or area 4 after being unwound from chamber 2 and before being wound onto spool 3a by an appropriate motive source or driving assembly (not shown).

Figure 2:
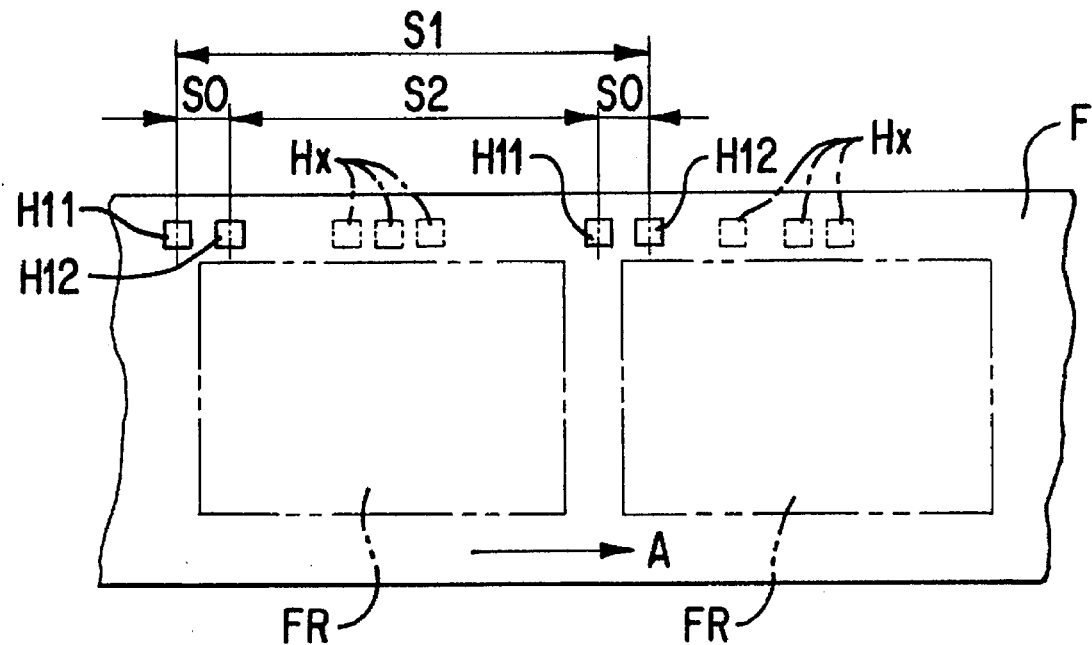
FIG. 2 is a illustration of the film used in the first embodiment of the invention.

As shown in FIG. 2, the film F includes two position detection holes H11, H12 aligned with the picture frame FR. Holes H11, H12 are spaced apart a distance S0 parallel to the film supply direction show by arrow A. S1 defines the distance between the position detection holes H11 of two adjoining picture frames FR and represents the picture frame FR pitch. Additionally, length S2, between adjoining picture frame position detection holes H12, H11, is greater than the length S0.

Detection apparatus 5 is positioned in the camera main body 1, between the film exposure area 4 and the spool chamber 3. The detection apparatus 5 includes base 50, a pair of detection bodies 51, 52 connected to the base 50, and a spring or biasing element, here coil spring 53, and a conduction plate 54.

The base 50 can move orthogonal to the film supply passage when the film F is inserted through the recessed part 1a of the main body 1. The coil spring 53 biases the base 50 orthogonally toward the film supply passage. The conduction plate 54 is fastened to a pressure plate 6 located on the opposite side from the base 50, divided by the film supply passage.

The base 50 is preferably constructed from an insulative material, such as plastic, ceramics or the like. The detection bodies 51, 52 are formed from an electrically conductive material, such as steel, copper or the like. The coil spring 53 may be formed from any appropriate elastic material. Further, the spring does not necessarily have to be a coil spring, as any appropriate biasing structure may be used.

The detection bodies 51, 52 are aligned parallel to each other in the film supply direction A. The bodies 51, 52 are spaced apart a distance equal to the distance S0 between the detection holes H11, H12. A face of the detection bodies 51, 52 is formed substantially in a square shape, facilitating the insertion of the detection bodies 51, 52 into the position detection holes H11, H12.

Figure 3:
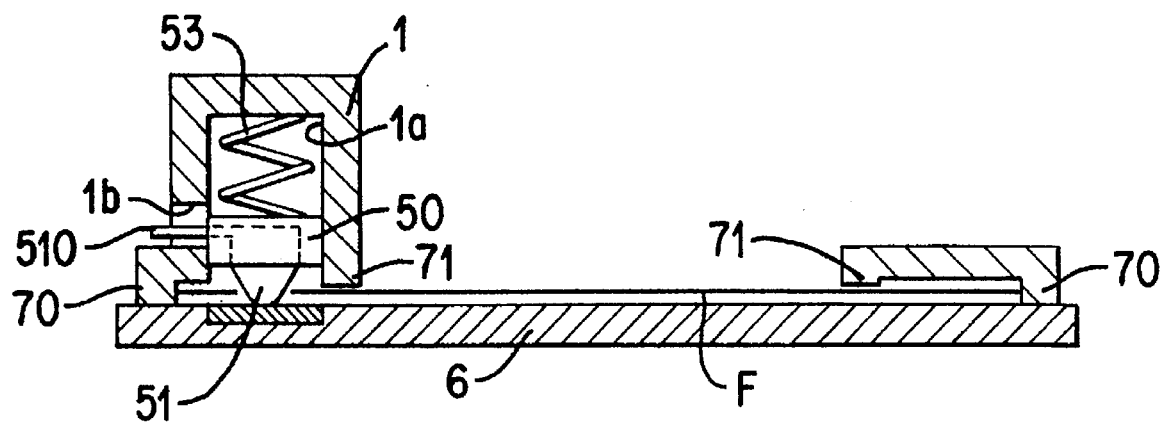
FIG. 3 is a cross-sectional view along line III—III of the FIG. 1.

As seen in FIGS. 3 and 4, the detection bodies 51, 52 include terminals 510, 520. The terminals 510, 520 are connected to an end of the detection bodies 51, 52 and project out of the recessed part 1a through hole 1b. The terminals 510, 520 are connected to a control apparatus (not shown), via an appropriate electrical connection, such as a flexible printed circuit board (FPCB) or the like.

Additionally, pressure plate 6 is provided to define film exposure area 4. The pressure plate 6 includes an external rail 70 and an internal rail 71. The rails 70, 71 guide and position the edges of film F, as the film F moves in the film supply direction A. This prevents the film F from moving perpendicularly to the film supply direction and ensures the alignment of the detection bodies 51, 52 and the position detection holes H11, H12.

Figure 4A:
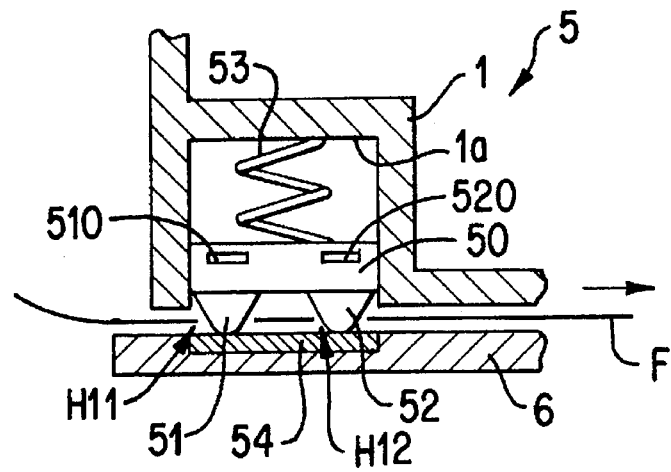
FIG. 4 is a diagram illustrating movement of the detection apparatus of FIG. 1.

In operation, when the film F is advanced, a picture frame FR is moved and aligned with the film exposure area 4. The film F is aligned at the film exposure area 4 so as to form a rectangularly shaped picture taking surface or luminous flux, as seen in FIG. 4(a). In this position, the detection bodies 51, 52 are positioned to overlie the position detection holes H11, H12.

The base 50, biased by the coil spring 53, urges the detection bodies 51, 52 into the position detection holes H11, H12. The detection bodies 51, 52 contact the conduction plate 54. This completes an electrical connection between the terminal 510 of detection body 51 and between the terminal 520 of detection body 52 through the conductor plate 54. Thus, an electrical signal can pass through terminals 510, 520.

Figure 4B:
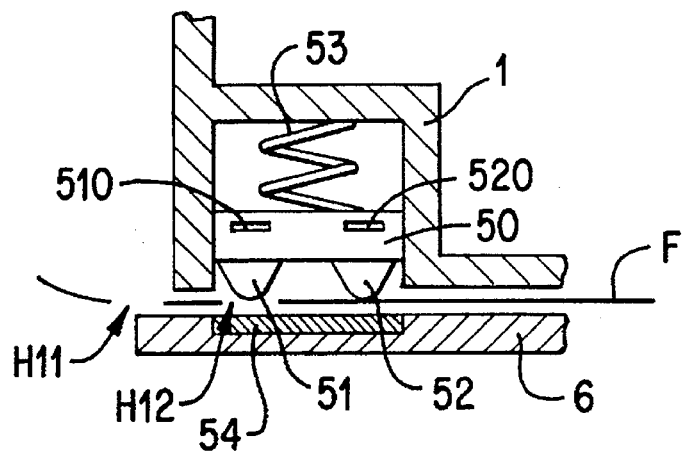
Figure 4C:
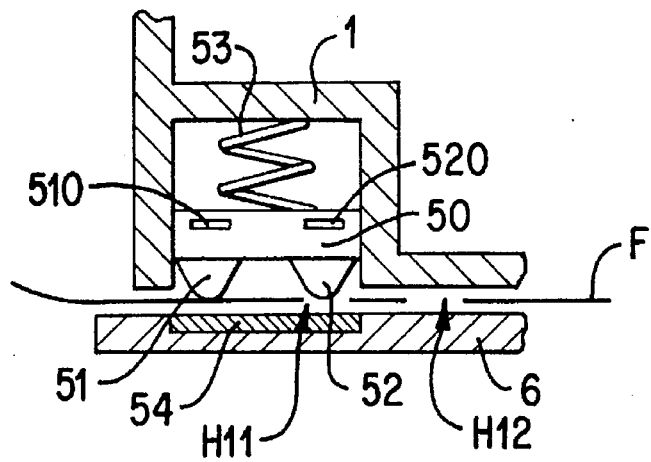

When the film F is moved in direction A, as seen in FIGS. 4(b) and 4(c), at least one of the detection bodies 51, 52 is caused to ride up onto the film F. This breaks the electrical connection between the detection bodies 51, 52 and the conduction plate 54, which in turn breaks the connection and signal through the terminals 510, 520.

When the next picture frame FR reaches a position aligned with the film exposure area 4, as in FIG. 4(a), the detection bodies 51, 52 are reinserted to the corresponding position detection holes H11, H12. The electrical connection between the terminals 510, 520 is again completed and a signal can pass through the terminals 510, 520. Therefore, when an electrical connection occurs through the terminals 510, 520, the picture frame FR of the film F is in an aligned position with the film exposure area 4.

If the bodies 51, 52 are not inserted into position detection holes H11, H1 after the film F has been advanced, the film F may not have moved a sufficient distance to align a new picture frame FR with the film exposure area 4. Alternatively, the film F may have moved too much so that the new picture frame FR is not aligned with the film exposure area 4.

Therefore, the invention also determines whether the film F has moved enough to properly advance to a picture film frame positioned state by determining if an electrical connection between bodies 51, 52 and the conduction plate 54 is made.

The terminals 510, 520 are preferably positioned and extend from the same side of the supply passage of the film F. This permits a relatively simple wiring scheme for the camera and detection device. The positioning of the terminals 510, 520 on the same side makes it unnecessary to wire the detection device from both sides, circling and crossing the film supply passage. Therefore, an easy and uncomplicated camera assembly is achieved.

A picture frame FR is detected when the detection bodies 51, 52 are inserted into the corresponding detection holes H11, H12. As shown by the broken dotted line of FIG. 2, even if other similarly shaped through holes are provided on the film, such as through holes Hx, that are positioned in approximately the same area of the position detection holes H11, H12 but not spaced apart a length S0, both of the detection bodies 51, 52 can not be inadvertently inserted into the through holes Hx. The electrical connection cannot be completed and an indication of proper film-frame position state will not occur because the distance between through holes Hx, or the distance between through holes Hx and one of the position detection holes H11, H12, does not equal the distance S0 between the position detection holes H11, H12. Therefore, the detection bodies 51, 52 do not make and complete the electrical connection. Using this relationship between the holes, the proper alignment of a picture frame FR is readily determined.

FIG. 5 shows a second embodiment of the invention, which is similar to the first embodiment and where similar parts are indicated by similar reference characters.

In the second embodiment, base 55 and detection bodies 56, 57 are shown constructed in an integral fashion, contrary to the first embodiment, where the base 50 and detection bodies 51, 52 are constructed separately. Either integral or separate components may be used in this embodiment and also in the first embodiment. The base 55 and detection bodies 56, 57 can be constructed from either an electrically insulative or conductive material.

The base 55 is orthogonally biased toward the film supply passage side by a spring or biasing element, here coil spring 53. The detection bodies 56, 57 can be simultaneously inserted into position detection holes H11, H12 in the film F, in a manner similar to the first embodiment.

On one side of the base 55, opposite the detection bodies 56, 57, an elongated member or rod 58 is provided. The rod 58 extends away from the film exposure area 4 and through hole 1c formed in the recessed part 1a. The rod 58 is connectable to one of a pair of armatures 59a, 59b. Armatures 59a, 59b are connected to a control apparatus (not shown), via appropriate electrical connection such as flexible printed circuit board (FPCB).

Figure 5A:
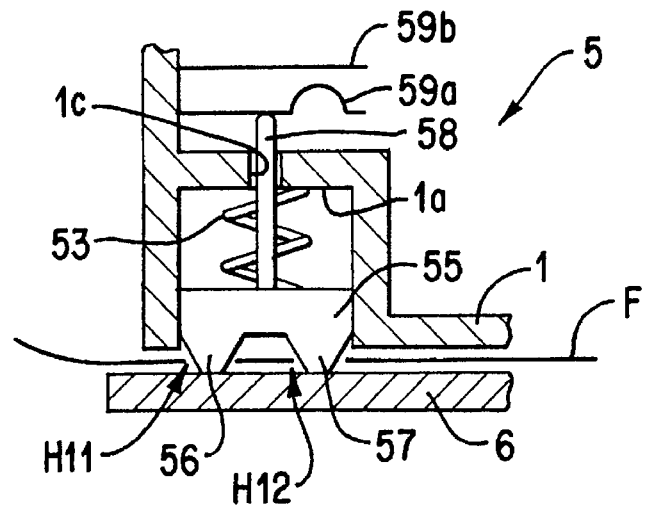
FIG. 5 is a diagram illustrating a second embodiment of the invention.

As shown in FIG. 5(a), detection bodies 56, 57 are normally biased by coil spring 53 to be inserted into position detection holes H11, H12, when the detection holes H11, H12 are aligned with the detection bodies 56, 57. The rod 58 is then retracted into the recessed part 1a and the pair of armatures 59a, 59b separate and an electrical connection between the armatures is broken.

Figure 5B:
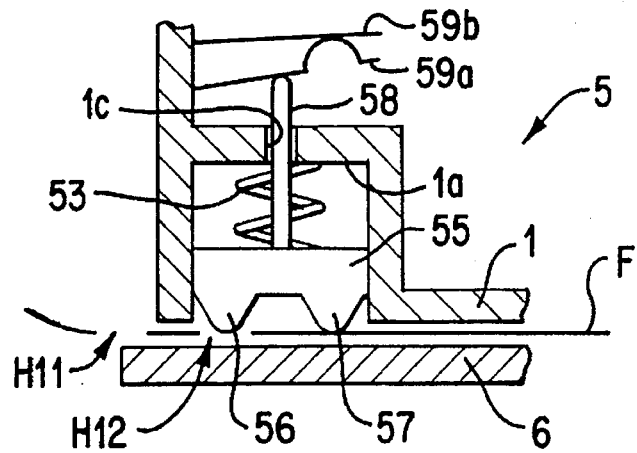
Figure 5C:
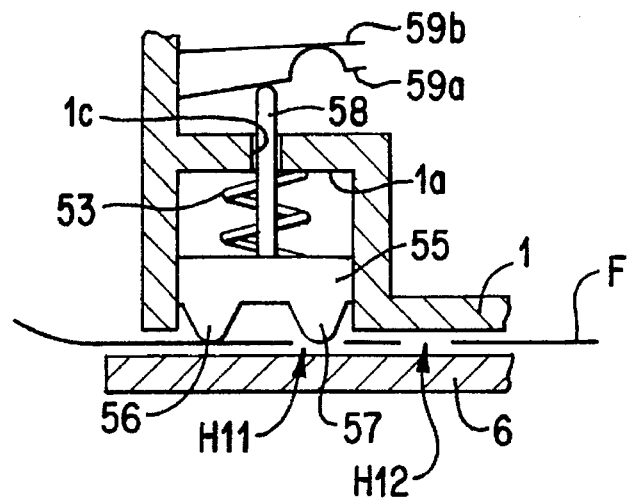

When film F is fed in the film supply direction A (FIG. 2) at least one of the detection bodies 56, 57 rides up onto the film F, as seen in FIGS. 5(b) and 5(c). This causes the rod 58 to be projected up through the recessed part 1a and through hole 1c. Armature 59a is then pushed upwardly (in FIG. 5(b)) to contact the armature 59b. An electrical connection is then made between armatures 59a, 59b and a signal indicating a film frame non-position state is generated.

Similar to the first embodiment, it is possible to determine whether the picture frame FR of the film F is aligned with the film exposure area 4, or whether the film F has not been fed by an equivalent amount equal to one picture frame FR, by detecting a connection between the armatures 59a, 59b.

In the second embodiment, armatures 59a, 59b are on the same side of the supply passage for the film F. This permits a relatively simple wiring scheme in the camera and detection device. The positioning of the armatures 59a, 59b on the same side makes it unnecessary to wire the device from both sides, circling and crossing the film supply passage. Therefore, an easy and uncomplicated assembly of the camera can be achieved.

Furthermore, armatures 59a, 59b do not have to be separately positioned for each detection bodies 56, 57. The armatures 59a, 59b can be formed from one piece. Thus, the structure is relatively simple with few movable parts. The determination and signaling can be conducted with relative ease.

Figure 6:
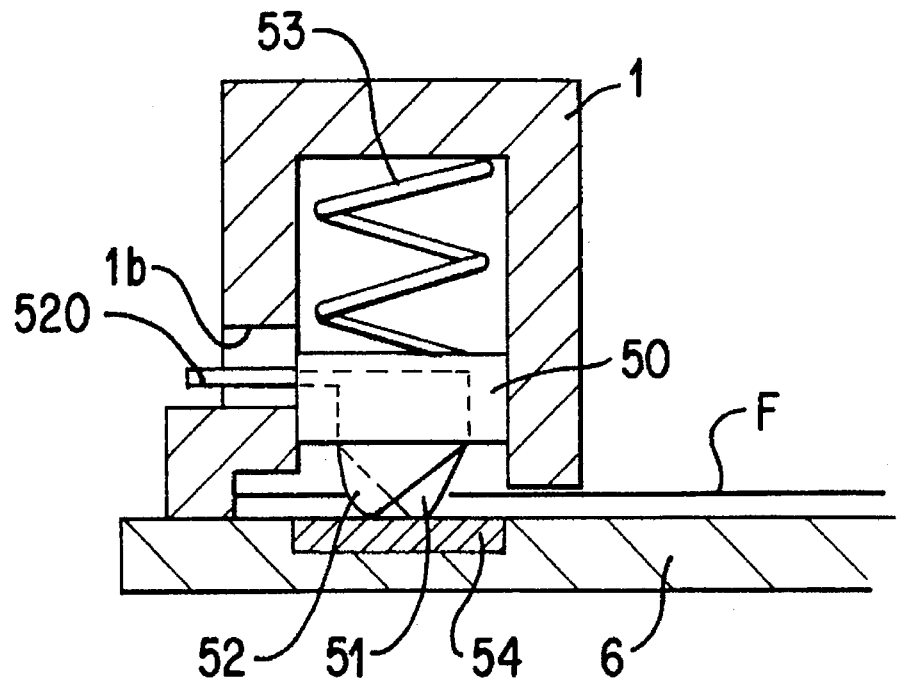
FIG. 6 is a diagram illustrating a modification of the first embodiment of the invention.

In each of the embodiments described above, the detection bodies 51, 52 or the detection bodies 56, 57 are spaced in the direction of film supply equal to 50, the space between position detection holes H11, H12. As shown in FIG. 6, if one of the detection bodies 56, 57 is displaced toward the film supply direction, the electrical connection is not made, and the aligned position signal for the film cannot be generated. Therefore, if the detection bodies 56, 57 are not aligned with the position detection holes H11, H12, a signal cannot be produced representative of a film's proper aligned position.

Figure 7:
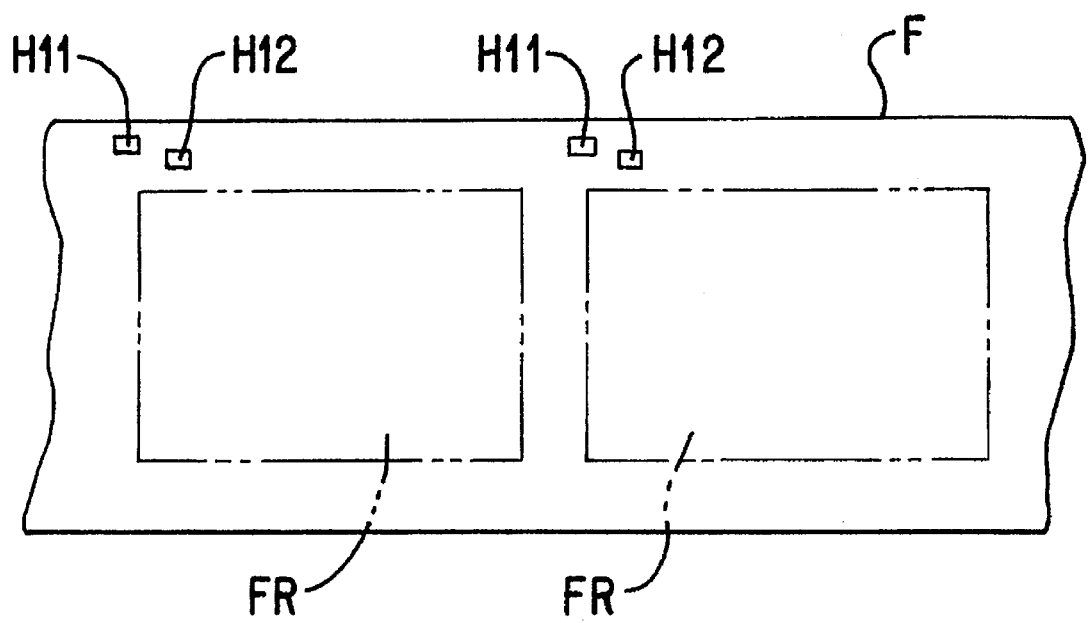
FIG. 7 is a diagram illustrating a modification for the position detection holes location in the film.

Additionally, the position detection holes H11, H12 are preferably arranged parallel to the film supply direction A. However, as shown in FIG. 7, the position detection holes H11, H12 can be positioned offset from each other as long as they are parallel or generally parallel to the film supply direction A. If the detection holes H11, H12 are offset, the detection bodies 51, 52 or 56, 57 must be similarly offset to cooperate with and be insertable into the holes.

The number of the position detection holes is not limited to two. Any number of position detection holes is possible as long as they correspond to detection holes in the film F. When the plurality of position detection holes and the detection bodies become aligned, the signal from the signal output device is changed to indicate detection of an aligned picture frame FR. Therefore, the change in the signal from the device is indicative of an aligned film position.

The detection circuit for the picture frame FR is also simplified. It avoids problems and limitations when additional through holes are added in the film F. By positioning the detection through holes H11, H12, spaced apart a present distance S0 between them, the detection device can determine if the film F has been moved so the distance S0 is detected. If the distance S0 is not detected, the film F has either not moved enough to align a new picture frame FR with the film exposure area 4 or the film F has moved too far beyond aligning a new picture frame FR with the film exposure area 4.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A detection device for determining a position of a frame of film, the film including a plurality of position detection holes corresponding with each frame of the film, the device comprising:

a plurality of detection bodies being movable toward the film and insertable into corresponding ones of the plurality of position detection holes for each frame of film;

a biasing device coupled to the plurality of detection bodies that non-pivotably urges the plurality of detection bodies toward the film in a direction generally normal to a direction of movement of the film; and a signal output device coupled to the plurality of detection bodies that generates a signal when all of the detection bodies are inserted into corresponding ones of the plurality of position detection holes for one frame of film, wherein the signal output device does not generate the signal when at least one of the plurality of detection bodies is not inserted in the corresponding ones of the plurality of position detection holes.

2. The device according to claim 1, wherein the signal output device includes a conduction plate, facing the plurality of detection bodies defining a film supply passage therebetween, that contacts the plurality of detection bodies when the plurality of detection bodies are inserted into the plurality of position detection holes, and a conductive terminal connected to each detection body, the conduction plate completing an electrical connection between the conductive terminals when the plurality of detection bodies are inserted through the corresponding ones of the plurality of position detecting holes to contact the conductive plate.

3. The device according to claim 1, the signal output device includes a pair of armatures movable from one state to another state and a member coupled to the plurality of detection bodies and contacting at least one of the armatures, wherein the member is moved by biasing the plurality of detection bodies and contacts at least one of the armatures, to cause the pair of armatures to change from one state to another state in response to the plurality of detection bodies being inserted into the plurality of position detection holes.

4. The device according to claim 3, wherein the member is a rod.

5. The device according to claim 3, wherein the armatures are spaced apart when the plurality of detection bodies are inserted into the corresponding film holes and the armatures contact to generate a signal when at least one of the plurality of detection bodies is not inserted into a corresponding position detection hole.

6. The device according to claim 1, being located in a camera having an unexposed film storage portion and an exposed film storage portion, wherein the detection device is positioned between the unexposed film storage portion and the exposed film storage portion.

7. The device according to claim 1, further including a base connected to the plurality of detection bodies and positioned between the plurality of two detection bodies and the biasing device.

8. The device according to claim 7, wherein the base is integral with the plurality of detection bodies.

9. The device according to claim 7, wherein the base is made of a conductive material.

10. The device according to claim 7, wherein the base is made of an insulative material.

11. The device according to claim 1, wherein the plurality of detection bodies are made of a conductive material.

12. The device according to claim 1, wherein the plurality of detection bodies are made of an insulative material.

13. The device according to claim 1, wherein the plurality of detection bodies include two detection bodies.

14. The device according to claim 1, wherein the plurality of detection bodies are aligned in a direction generally parallel with respect to a direction of film forwarding.

15. The device according to claim 1, wherein the plurality of detection bodies are offset from each other with respect to a direction of film forwarding.

16. A detection device for locating a film, the film including two position detection holes corresponding to each frame of the film, the two position detection holes being aligned in a direction generally parallel to a film supply direction, a space between the two position detection holes for each frame and a space between a position detection hole of one frame and a position detection hole of an adjacent frame being different, the detection device comprising:

detection means for inserting into corresponding position detection holes for one frame of film, moving toward and away from the film and the position detection holes of the film, the detection means comprising two detection bodies being spaced apart a distance equal to the two position detection holes for one picture frame;

biasing means coupled to the detection means for non-pivotably urging the detection means toward the film in a direction generally normal to a direction of movement of the film; and signal means coupled to the detection means for generating a first signal when two detection bodies of the detection means are both inserted into the position detection holes, the signal means generating a second signal different from the first signal, when at least one of the two detection bodies of the detection means is not inserted in the position detection holes.

17. The device according to claim 16, wherein the two detection bodies are being spaced apart and aligned in a direction generally parallel to the film supply direction.

18. The device according to claim 16, wherein the two detection bodies are being spaced apart and offset in a direction generally parallel to the film supply direction.

19. The device according to claim 16, wherein the signal means comprises:

contact means for making an electrical contact with the detection means when the two detection bodies are inserted into the two position detection holes, and terminal means connected to the two detection bodies, the contact means permitting an electrical connection to be made between the terminal means when the two detection bodies are inserted through the corresponding ones of the two position detecting holes.

20. The device according to claim 16, wherein the signal means comprises armature means for moving from one state to another state in response to biasing of the detection means against the film, the detection means comprising a member extending from the two detection means and contacting the armature means, wherein the member is moved by biasing the detection means against the film to cause the armature means to change from one state to another state in response to the detection means being inserted into the two position detection holes.

21. The device according to claim 19, wherein the armature means includes two elements movable with respect to each other between a contacting state to generate a first signal and a non-contacting state to generate a second signal.

22. The device according to claim 21, wherein the two elements form electric contacts and terminals, where an electrical connection is made in the contacting state and an electrical connection is not made in the non-contacting state.

23. A method for locating a film, the film including at least two position detection holes corresponding to each picture frame, the at least two position detection holes being generally parallel to a film supply direction and a space between two of the at least two position detection holes for one picture frame and a space between corresponding position detection holes between the one picture frame and an adjacent picture frame being different, the method comprising the steps of:

non-pivotably biasing the at least two detection bodies toward the film and the at least two position detection holes in a direction generally normal to a film supply direction;

moving the film in the film supply direction;

inserting the at least two detection bodies into corresponding ones of the at least two position detection holes in the film, the at least two detection bodies being generally parallel to a direction of film supply with a distance equal to the two position detection holes of one picture frame; and generating a signal when two of the at least two detection bodies are inserted into the position detection holes of one frame of film.

24. The method according to claim 23, wherein the generating step further includes the steps of:

electrically connecting the at least two detection bodies when inserted into the at least two position detection holes.

25. The method of claim 23, wherein the signal is a first signal and the step of generating further includes generating a second signal, different from the first signal when at least one detection body is not inserted into the position detection holes.

26. A camera having a detection device for determining a position of a frame of film and a strip of film releasably retained in the camera movable in a film supply direction, the film comprising a plurality of frames of film, each frame having a plurality of position detection holes, wherein two of the plurality of position detection holes correspond to each picture frame of the film, the two of the plurality of position detecting holes being arranged generally parallel to a film supply direction, a distance between the two of the plurality of position detection holes for a frame of the film and a distance between a position detection hole of one picture frame and a corresponding position detection hole of an adjacent picture frame being different; and the position detection device comprising a plurality of detection bodies being movable toward the film and insertable into corresponding ones of the plurality of position detection holes, the plurality of detection bodies being spaced apart generally parallel to the film supply direction a distance equal to the position detection holes for one picture frame;

a biasing device coupled to the plurality of detection bodies that non-pivotably urges the plurality of detection bodies toward the film in a direction generally normal to a direction of movement of the film; and a signal output device coupled to the detection bodies generating a signal when all of the detection bodies are inserted into corresponding ones of the position detection holes for one frame of film, the signal output device not generating the signal when one of the plurality of detection bodies is not inserted in the corresponding position detection holes.

27. The device according to claim 26, wherein the position detection holes for each frame are aligned in a direction generally parallel with the film supply direction and the detection bodies are aligned in a direction generally parallel with respect to the film supply direction.

28. The device according to claim 26, wherein the position detection holes for each frame are offset in a direction generally parallel with respect to the film supply direction and the detection bodies are offset in a direction generally parallel with the film supply direction.

29. The device according to claim 26, wherein the signal input device comprises an electric terminal coupled to the detection bodies and a contact plate disposed in the film supply direction opposed to the detection bodies, wherein when the detection bodies are inserted into the position detection holes of one frame of film, the detection bodies contact the contact plate and complete and electrical connection between the electrical terminals thereby signalling the proper position of the frame of film.

30. The device according to claim 26, wherein the signal output device comprises a pair of armatures each having an electric terminal connected thereto, movable with respect to each other and biased away from each other, wherein upon insertion of the detection bodies into the position detection holes of one frame of film, the armatures separate and break electrical connection signaling proper positioning of the frame of film.

* * * * *